United States Patent
Maruyama

(10) Patent No.: US 12,325,404 B2
(45) Date of Patent: Jun. 10, 2025

(54) BRAKING CONTROL DEVICE

(71) Applicant: ADVICS CO., LTD., Kariya (JP)

(72) Inventor: Masaki Maruyama, Kariya (JP)

(73) Assignee: ADVICS CO., LTD., Kariya (JP)

( * ) Notice: Subject to any disclaimer, the term of this patent is extended or adjusted under 35 U.S.C. 154(b) by 183 days.

(21) Appl. No.: 18/007,074

(22) PCT Filed: Jul. 29, 2021

(86) PCT No.: PCT/JP2021/028098
§ 371 (c)(1),
(2) Date: Jan. 27, 2023

(87) PCT Pub. No.: WO2022/025183
PCT Pub. Date: Feb. 3, 2022

(65) Prior Publication Data
US 2023/0264664 A1 Aug. 24, 2023

(30) Foreign Application Priority Data
Jul. 31, 2020 (JP) .................. 2020-130299

(51) Int. Cl.
B60T 8/32 (2006.01)
B60T 7/12 (2006.01)
B60T 8/171 (2006.01)

(52) U.S. Cl.
CPC .............. *B60T 8/3275* (2013.01); *B60T 7/12* (2013.01); *B60T 8/171* (2013.01)

(58) Field of Classification Search
CPC .......... B60T 8/3275; B60T 7/12; B60T 8/171; B60T 13/662; B60T 17/22; B60T 7/122; B60T 2201/06
See application file for complete search history.

(56) References Cited

U.S. PATENT DOCUMENTS

| 2011/0040465 A1 | 2/2011 | Suda |
| 2014/0214252 A1* | 7/2014 | Koike ................. B60W 10/30 |
| | | 701/22 |
| 2021/0139006 A1 | 5/2021 | Hiromura et al. |

FOREIGN PATENT DOCUMENTS

| JP | 2009274490 A | 11/2009 |
| JP | 2014144719 A | 8/2014 |

(Continued)

OTHER PUBLICATIONS

International Search Report (PCT/ISA/210) with translation and Written Opinion (PCT/ISA/237) mailed on Oct. 12, 2021, by the Japan Patent Office as the International Searching Authority for International Application No. PCT/JP2021/028098, 5 pages.

*Primary Examiner* — Russell Frejd
*Assistant Examiner* — Ana D Thomas
(74) *Attorney, Agent, or Firm* — BUCHANAN INGERSOLL & ROONEY PC

(57) ABSTRACT

The braking control device includes a determination unit configured to determine whether a vehicle is in a stopped state; a setting unit configured to set a vehicle stop maintenance braking force necessary for maintaining the stopped state of the vehicle; and a control unit configured to execute, when the determination unit determines that the vehicle is in the stopped state and an actual braking force applied in the stopped state of the vehicle is greater than the vehicle stop maintenance braking force set by the setting unit, vehicle stop maintenance control for decreasing the actual braking force toward the vehicle stop maintenance braking force regardless of a required braking force required by at least one of a driver of the vehicle and another device.

12 Claims, 2 Drawing Sheets

(56) References Cited

FOREIGN PATENT DOCUMENTS

| JP | 2014218158 | A |   | 11/2014 |   |
|----|------------|---|---|---------|---|
| JP | 2018154176 | A | * | 10/2018 |   |
| JP | 2019010960 | A |   | 1/2019  |   |
| JP | 6658635    | B2 | * | 3/2020 | ............... B60T 7/12 |

\* cited by examiner

BRAKING CONTROL DEVICE

TECHNICAL FIELD

The present disclosure relates to a braking control device.

BACKGROUND ART

As a braking control device, for example, JP2009-274490A discloses a device that executes hydraulic pressure gradient restriction control in normal braking and relaxes restriction in the hydraulic pressure gradient restriction control in emergency braking. Accordingly, generation of abnormal noise due to hydraulic pressure pulsation during the normal braking is prevented, and responsiveness during the emergency braking is also ensured.

CITATION LIST

Patent Literature

PTL 1: JP2009-274490A

SUMMARY

Technical Problem

In the above patent literature, a control from a start of braking to a stop of a vehicle is disclosed, but a control after the stop of the vehicle (for example, after a vehicle speed becomes 0) is not disclosed. The above braking control device has room for improvement in control on a braking force in a vehicle stopped state.

An object of the disclosure is to provide a braking control device capable of preventing an excessive braking force from being applied to wheels in a vehicle stopped state.

Solution to Problem

A braking control device according to the disclosure includes: a determination unit configured to determine whether a vehicle is in a stopped state; a setting unit configured to set a vehicle stop maintenance braking force necessary for maintaining the stopped state of the vehicle; and a control unit configured to execute, when the determination unit determines that the vehicle is in the stopped state and an actual braking force applied in the stopped state of the vehicle is greater than the vehicle stop maintenance braking force set by the setting unit, vehicle stop maintenance control for decreasing the actual braking force toward the vehicle stop maintenance braking force regardless of a required braking force required by at least one of a driver of the vehicle and another device.

Advantageous Effects

According to the disclosure, after the vehicle stops, the actual braking force is decreased toward the vehicle stop maintenance braking force by the vehicle stop maintenance control. Therefore, according to the disclosure, an excessive braking force can be prevented from being applied to the wheels in the vehicle stopped state.

DESCRIPTION OF EMBODIMENTS

Figure 1:
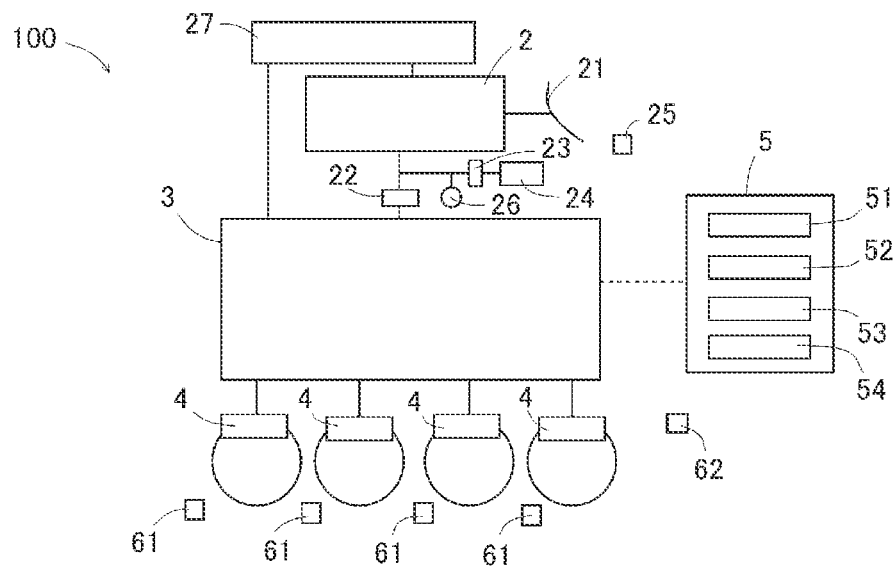
FIG. 1 is a configuration diagram of a vehicle braking device including a braking control device according to the present embodiment.

Hereinafter, an embodiment of the braking control device will be described with reference to the drawings. Each drawing used in the description is a conceptual diagram. As shown in FIG. 1, a vehicle braking device 100 according to the present embodiment includes a master cylinder 2, a hydraulic pressure generation unit 3, a plurality of wheel cylinders 4, and a braking control device 5. The vehicle braking device 100 is a braking device with a so-called by-wire configuration. Since the by-wire configuration is known, an example thereof will be briefly described.

The master cylinder 2 is a device that outputs brake fluid in response to an operation on a brake pedal 21 performed by a driver. The master cylinder 2 is configured to supply, in response to a brake operation, the brake fluid to the wheel cylinders 4 via the hydraulic pressure generation unit 3. In the master cylinder 2, a master chamber is formed by a cylinder and a piston (not shown).

In normal control, a fluid passage connecting the master chamber of the master cylinder 2 and the hydraulic pressure generation unit 3 is blocked by a master cut valve 22. Therefore, the brake fluid in the master cylinder 2 is supplied to a stroke simulator 24 via a simulator cut valve 23 in response to the brake operation. A reaction force (reaction force pressure) is applied to the brake pedal 21 by the stroke simulator 24.

An amount of operation on the brake pedal 21 is detected by a stroke sensor 25 or a pressure sensor 26 that detects the reaction force pressure (depression force). When a power supply is abnormal, the master cut valve 22 is opened, the simulator cut valve 23 is closed, and the brake fluid in the master cylinder 2 is supplied to the wheel cylinders 4 via the hydraulic pressure generation unit 3 in response to an operation on the brake pedal 21.

The hydraulic pressure generation unit 3 is a device that generates hydraulic pressures in the plurality of wheel cylinders 4. The hydraulic pressure generation unit 3 is configured to regulate the pressure of each wheel cylinder 4. The hydraulic pressure generation unit 3 may be, for example, a device including an ESC actuator and an accumulator, or a device including an electric cylinder. The brake fluid is supplied to the hydraulic pressure generation unit 3 from a reservoir 27 of the master cylinder 2. The braking control device 5 controls the hydraulic pressure generation unit 3 according to the amount of operation on the brake pedal 21 or a braking request from another device to adjust the hydraulic pressure of each wheel cylinder.

(Barking Control Device)

The braking control device 5 is a brake ECU (electronic control unit) including a CPU, a memory, and the like. The braking control device 5 executes various types of control using one or more processors. The braking control device 5 includes an acquisition unit 51, a control unit 52, a determination unit 53, and a setting unit 54. The acquisition unit 51 acquires a required braking force required by at least one of a driver and another device. The acquisition unit 51 calculates the required braking force based on the braking request from the driver, that is, the amount of operation on the brake pedal 21 (a detection value of the stroke sensor 25 and/or the pressure sensor 26). In addition, the acquisition unit 51 receives, for example, a required braking force transmitted from another ECU in the vehicle.

The control unit 52 controls an actual braking force such that the actual braking force applied to each of the wheels of the vehicle follows the required braking force. The actual braking force is a braking force in the actual case and is a value correlated with a detected or estimated hydraulic pressure of each wheel cylinder 4 (hereinafter, referred to as "wheel pressure"). The control unit 52 controls the hydraulic pressure generation unit 3 such that the actual braking force approaches the required braking force acquired by the acquisition unit 51. In other words, the control unit 52 controls the hydraulic pressure generation unit 3 such that the wheel pressure approaches a target wheel pressure acquired (calculated) by the acquisition unit 51.

The determination unit 53 determines whether the vehicle is in a stopped state. For example, the determination unit 53 determines whether the vehicle is in the stopped state based on a detection result of a wheel speed sensor 61 provided on each wheel. For example, when a vehicle speed becomes 0, the determination unit 53 determines that the vehicle is in the stopped state.

The setting unit 54 sets a vehicle stop maintenance braking force necessary for maintaining the stopped state of the vehicle. For example, the setting unit 54 stores, as an initial vehicle stop maintenance braking force, a braking force obtained by adding a predetermined value a (a 0) to a minimum braking force that is calculated in advance and is necessary for stopping the vehicle. The setting unit 54 changes (corrects) the initial vehicle stop maintenance braking force according to a state of the vehicle.

Specifically, for example, the setting unit 54 calculates a road surface gradient when the vehicle stops based on a detection result from an acceleration sensor 62. The setting unit 54 sets the vehicle stop maintenance braking force according to the road surface gradient when the vehicle stops. The setting unit 54 increases the vehicle stop maintenance braking force as the road surface gradient increases. In addition, for example, the setting unit 54 sets the vehicle stop maintenance braking force based on a change in a vehicle weight caused by an occupant, a load, or the like. The setting unit 54 increases the vehicle stop maintenance braking force as the vehicle weight increases. Accordingly, the setting unit 54 sets the vehicle stop maintenance braking force according to the state of the vehicle (for example, the road surface gradient or the vehicle weight).

In addition, for example, a relation (map) between the vehicle stop maintenance braking force and the amount of operation (for example, the depression force) on the brake pedal 21 performed by the driver may be set in advance in the setting unit 54. In addition, for example, a relation (map) between the vehicle stop maintenance braking force and a value B obtained by multiplying the amount of operation on the brake pedal 21 by a coefficient, which is obtained based on the road surface gradient, may be set in advance in the setting unit 54. Accordingly, the setting unit 54 may use, when setting the vehicle stop maintenance braking force, a map in which the vehicle stop maintenance braking force is output by inputting the "brake operation amount" or the "brake operation amount and the vehicle state (for example, the road surface gradient)". For example, the map is set such that the vehicle stop maintenance braking force increases as the calculated value B increases.

(Vehicle Stop Maintenance Control)

When the determination unit 53 determines that the vehicle is in the stopped state and the actual braking force applied in the stopped state of the vehicle is greater than the vehicle stop maintenance braking force set by the setting unit 54, the control unit 52 executes vehicle stop maintenance control for decreasing the actual braking force toward the vehicle stop maintenance braking force regardless of a required braking force required by at least one of the driver of the vehicle and another device. In other words, when a predetermined execution condition is satisfied, the control unit 52 starts the vehicle stop maintenance control for reducing the actual braking force to the vehicle stop maintenance braking force.

Further, in the vehicle stop maintenance control, the control unit 52 gradually decreases the actual braking force to the vehicle stop maintenance braking force. In other words, in the vehicle stop maintenance control, the control unit 52 sets a decreasing gradient (decrease amount per unit time) of the actual braking force to a predetermined gradient or smaller when the actual braking force is decreased to the vehicle stop maintenance braking force. The predetermined gradient is set in advance in consideration of a system load in hydraulic pressure control. The gradient can be said to be a speed. The control unit 52 decreases the actual braking force over time. During the execution of the vehicle stop maintenance control, the control unit 52 controls the hydraulic pressure generation unit 3 such that the actual braking force approaches the vehicle stop maintenance braking force instead of the required braking force.

An end condition for the vehicle stop maintenance control is set to, for example, that the vehicle starts up (the vehicle speed>0), that an accelerator pedal (not shown) is operated, or that a probability of starting up the vehicle is high. The control unit 52 ends the vehicle stop maintenance control at a timing at which at least one of the starting up of the vehicle, the operation on the accelerator pedal, and the high probability of starting up the vehicle is detected.

The control unit 52 according to the present embodiment determines whether the probability of starting up the vehicle is high. For example, when the operation on the brake pedal 21 is released, the control unit 52 determines that the probability of starting up the vehicle is high. More specifically, for example, when the decreasing gradient of the required braking force or the stroke is equal to or larger than a predetermined gradient or when the required braking force or the stroke is equal to or smaller than a predetermined value (for example, when the required braking force is smaller than the vehicle stop maintenance braking force), the control unit 52 determines that the probability of starting up the vehicle is high.

In addition, for example, when an inter-vehicle distance between an own vehicle and a preceding vehicle is a predetermined value or more, the control unit 52 may determine that the probability of starting up the vehicle is high. In addition, for example, when forward signal information changes from red to green, the control unit 52 may determine that the probability of starting up the vehicle is high. In addition, for example, the control unit 52 may determine whether the probability of starting up the vehicle is high based on information received by an intelligent transportation system (ITS).

Accordingly, for example, the control unit 52 determines whether the probability of starting up the vehicle is high based on at least one of the required braking force, the stroke, a depression force, the signal information, the inter-vehicle distance, and the ITS information. When the probability of starting up the vehicle is high, the control unit 52 ends the vehicle stop maintenance control. When the vehicle stop maintenance control ends, control performed by the control unit 52 returns to normal control, that is, control of causing the actual braking force to follow the required braking force.

In summary, the braking control device 5 according to the present embodiment includes the determination unit 53 that determines whether the vehicle is in the stopped state, the setting unit 54 that sets the vehicle stop maintenance braking force necessary for maintaining the stopped state of the vehicle, and the control unit 52 that executes the vehicle stop maintenance control when the actual braking force is larger than the vehicle stop maintenance braking force in the vehicle stopped state.

(Example of Vehicle Stop Maintenance Control)

Figure 2:
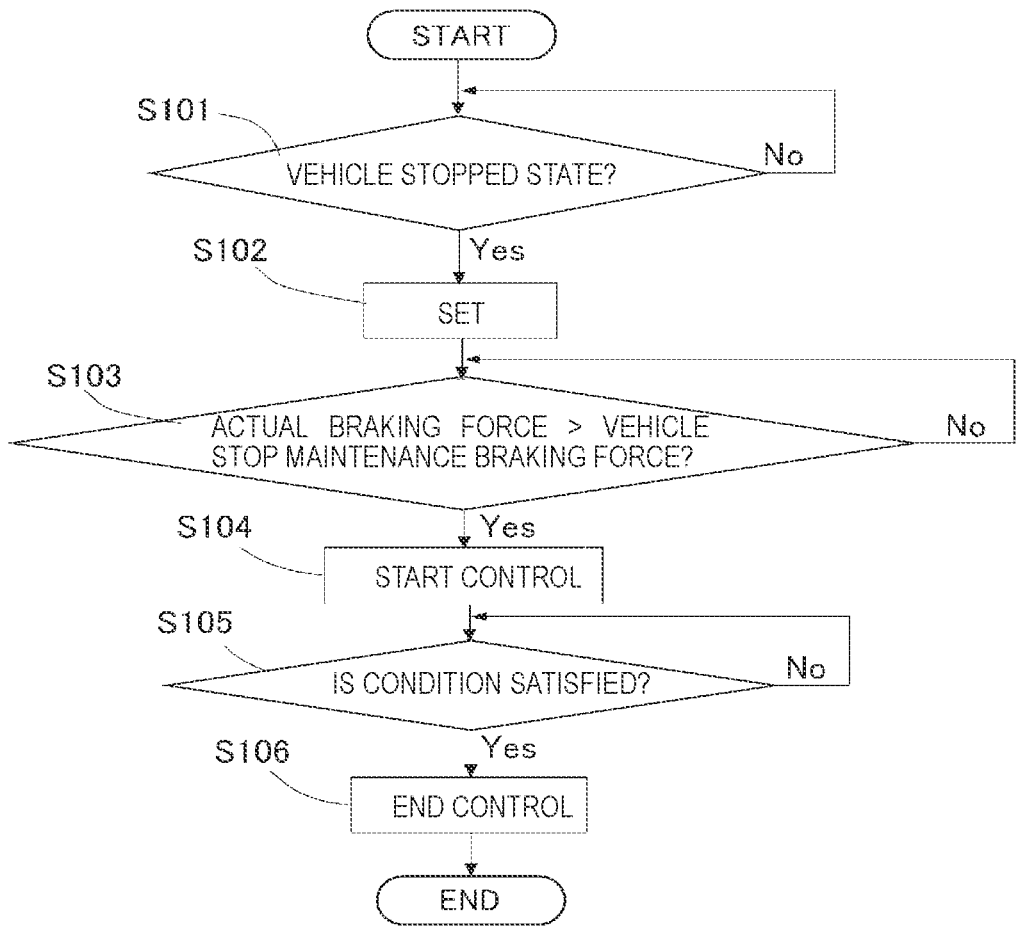
FIG. 2 is a flowchart showing an example of a vehicle stop maintenance control according to the present embodiment.

An example of the vehicle stop maintenance control will be described with reference to FIGS. 2 and 3. As shown in FIG. 2, when the determination unit 53 determines that the vehicle is in the stopped state (S101: Yes), the setting unit 54 sets the vehicle stop maintenance braking force (S102). Subsequently, the control unit 52 determines whether the actual braking force is larger than the vehicle stop maintenance braking force (S103). When the actual braking force is larger than the vehicle stop maintenance braking force (S103: Yes), the control unit 52 executes the vehicle stop maintenance control (S104). That is, the control unit 52 controls the hydraulic pressure generation unit 3 to gradually decrease the actual braking force to the vehicle stop maintenance braking force. When the end condition for the vehicle stop maintenance control is satisfied (S105: Yes), the control unit 52 ends the vehicle stop maintenance control (S106).

Figure 3:
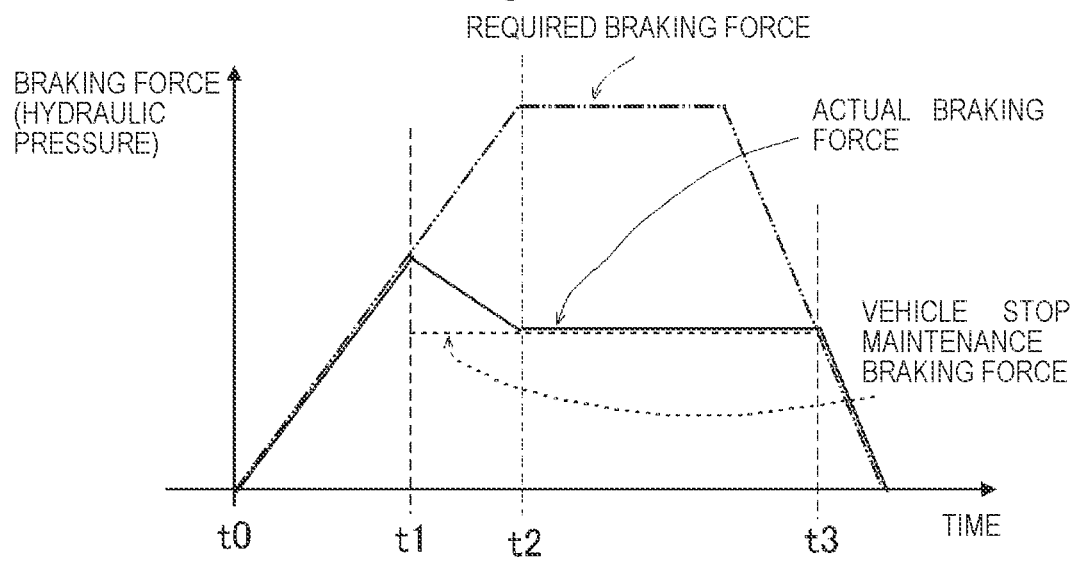
FIG. 3 is a time chart showing an example of the vehicle stop maintenance control according to the present embodiment.

According to a time chart, as shown in FIG. 3, the driver depresses the brake pedal 21 at a time t0, and the required braking force starts to increase. At a time t1, the vehicle state is switched from a traveling state to the stopped state, and the actual braking force is larger than the vehicle stop maintenance braking force, and therefore the vehicle stop maintenance control is executed. That is, the vehicle stop maintenance control is started from a time point (time t1) at which the vehicle stops.

During a period from the time t1 to a time t2, the actual braking force is decreased at a predetermined gradient. At the time t2, the actual braking force becomes the vehicle stop maintenance braking force, and thereafter, the actual braking force is maintained at the vehicle stop maintenance braking force until the vehicle stop maintenance control is ended (time t2 to time t3). In FIG. 3, the actual braking force is represented on an assumption that the actual braking force changes with driving of the hydraulic pressure generation unit 3 without delay.

(Effects of Present Embodiment)

According to the present embodiment, after the vehicle stops, the actual braking force is decreased toward the vehicle stop maintenance braking force by the vehicle stop maintenance control. Therefore, according to the present embodiment, it is possible to prevent an excessive braking force from being applied to the wheels in the vehicle stopped state. That is, according to the present embodiment, it is possible to save power of the vehicle braking device 100. According to the vehicle stop maintenance control, for example, even if the driver depresses the brake pedal 21 more than necessary, the actual braking force can be decreased to a relatively small braking force capable of maintaining the vehicle stop. According to the present embodiment, the power consumption is reduced by lowering the braking force (output), and the system is protected by reduction in a high-load operation scene. The vehicle stop maintenance control can also be referred to as power saving control when the vehicle stops.

In addition, since the actual braking force is gradually decreased in the vehicle stop maintenance control, it is possible to prevent an increase in a load on the device caused by a rapid change in the hydraulic pressure. In addition, the setting unit 54 sets (corrects) the vehicle stop maintenance braking force corresponding to the state of the vehicle. Accordingly, a more appropriate vehicle stop maintenance braking force corresponding to the vehicle stopped state is set.

In addition, the vehicle stop maintenance control according to the present embodiment is set to be ended when the probability of starting up the vehicle is high. Accordingly, for example, before an accelerator operation is performed by the driver, the vehicle stop maintenance control is released, and the actual braking force corresponding to the required braking force is applied to the wheels. Therefore, the driver can start up the vehicle with a feeling close to that on a vehicle in which the vehicle stop maintenance control is not executed.

(Another Example of Vehicle Stop Maintenance Control)

In the vehicle stop maintenance control, the setting unit 54 increases the vehicle stop maintenance braking force toward the required braking force when a difference between the required braking force and the vehicle stop maintenance braking force is a predetermined value or larger. In addition, when increasing the vehicle stop maintenance braking force with the increase of the required braking force, the setting unit 54 increases the vehicle stop maintenance braking force at an increasing speed (increasing gradient) smaller than an increasing speed (increasing gradient) of the required braking force.

Figure 4:
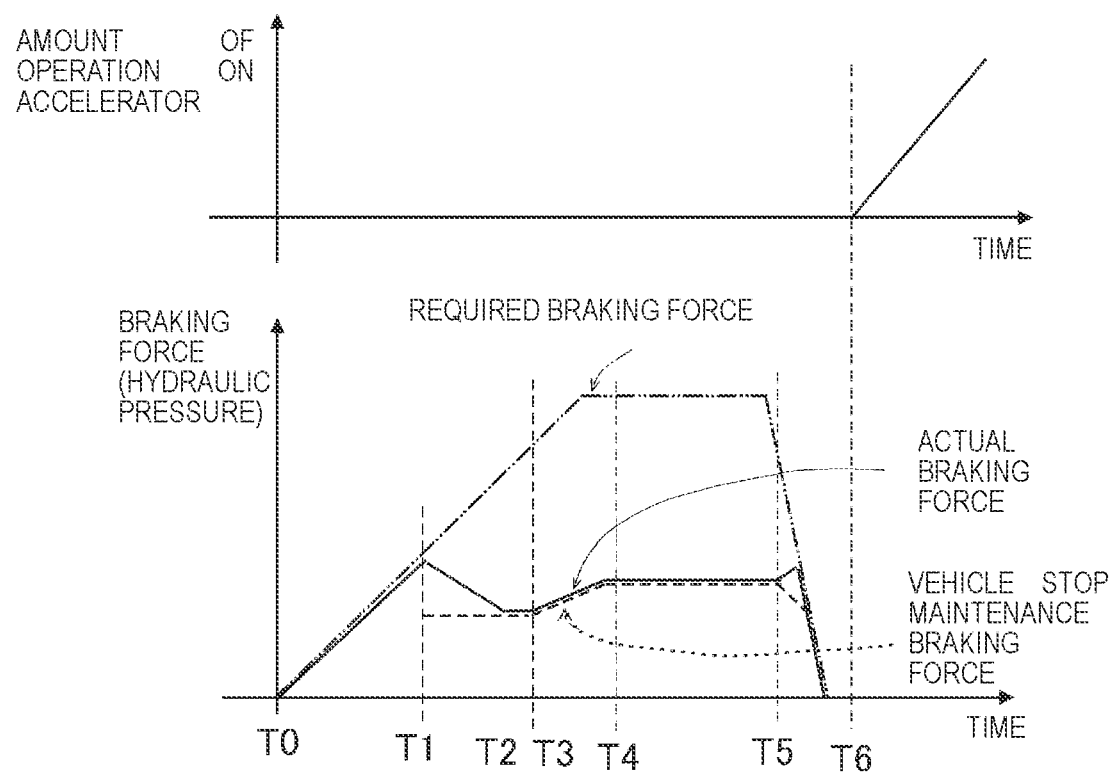
FIG. 4 is a time chart showing another example of the vehicle stop maintenance control according to the present embodiment.

Specifically, as shown in FIG. 4, the driver depresses the brake pedal 21 at a time TO, and the required braking force starts to increase. At a time T1, the vehicle stops, and the vehicle stop maintenance control is started. At a time T2, the actual braking force reaches the vehicle stop maintenance braking force. During a period from the time T2 to a time T3, the actual braking force is maintained constant. In this example, even after the time T2, the depression force of the driver increases for a while, and the required braking force increases. The setting unit 54 continues to acquire the required braking force and changes the vehicle stop maintenance braking force according to the required braking force.

At the time T3, a difference between the required braking force and the vehicle stop maintenance braking force is the predetermined value or larger. After the time T3, for example, the setting unit 54 slowly increases (gradually increases) the vehicle stop maintenance braking force until the difference between the required braking force and the vehicle stop maintenance braking force is smaller than the predetermined value. The increasing speed of the vehicle stop maintenance braking force during this time is set to a value smaller than the increasing speed of the required braking force. At a time T4, the difference between the required braking force and the vehicle stop maintenance braking force is smaller than the predetermined value, and the setting unit 54 stops increasing the vehicle stop maintenance braking force. During a period from the time T4 to a time T5, the vehicle stop maintenance braking force is constant, and the actual braking force is also constant.

The driver removes a foot from the brake pedal 21, and at the time T5, the control unit 52 detects that the decreasing gradient of the required braking force or the stroke is a predetermined gradient or larger. That is, at the time T5, the control unit 52 determines that the probability of starting up the vehicle is high, and ends the vehicle stop maintenance control.

After the vehicle stop maintenance control is ended, the control unit 52 performs control such that the actual braking force follows the required braking force. Accordingly, as in the example of FIG. 4, the actual braking force may slightly increase. However, since the actual braking force which is equal to or greater than the vehicle stop maintenance braking force is changed when the vehicle stops, an influence on a driving feeling of the driver is small. In addition, the difference between the actual braking force and the required braking force at the time T5 can be reduced by increasing the vehicle stop maintenance braking force (that is, the actual braking force) during a period from the time T3 to the time T4 by the setting unit 54. Accordingly, a rapid increase in the actual braking force when the vehicle stop maintenance control is ended is prevented.

Thereafter, when the accelerator pedal is operated at a time T6, the actual braking force becomes 0 according to the required braking force. The control unit 52 may end the vehicle stop maintenance control at the time T6 instead of the time T5. In this case, there is a possibility that the actual braking force remains at the time of the accelerator operation. Therefore, when the vehicle stop maintenance control is ended at the time T5 before the time T6, the driver is more likely to have a feeling, at the time of starting up the vehicle, close to that on a vehicle in which the vehicle stop maintenance control is not executed.

(Effects of Another Example)

As during the period from the time T3 to the time T4 in FIG. 4, by increasing the vehicle stop maintenance braking force by the setting unit 54 such that the difference between the required braking force and the vehicle stop maintenance braking force is not too large, control on a sudden change in the wheel pressure (actual braking force) after the vehicle stop maintenance control is ended can be eliminated. Accordingly, an increase in a system load due to the control on rapid increase in the hydraulic pressure can be prevented. In addition, by setting the increasing speed of the vehicle stop maintenance braking force to be smaller than the increasing speed of the required braking force, the increase in the system load due to the hydraulic pressure rapid increase control is prevented as described above.

OTHERS

The disclosure is not limited to the above embodiment. For example, the vehicle stop maintenance control may be started after the vehicle stops (when the vehicle is in the stopped state) without being limited to only when the vehicle state is switched from the traveling state to the stopped state. In addition, the vehicle braking device 100 may have a by-wire configuration in which the wheel pressures can be adjusted independently of the brake operation of the driver, and may have a known by-wire configuration other than that according to the above embodiment.

The master cylinder 2 may be a single master cylinder having one piston (one master chamber) or may be a tandem master cylinder having two pistons (two master chambers). In addition, the vehicle braking device 100 may have a configuration (servo configuration) in which a brake fluid supply device including a pump drives the piston of the master cylinder.

In addition, the braking force to be controlled by the braking control device 5 is not limited to a braking force generated based on the hydraulic pressure, and may be, for example, a braking force generated based on an electronic mechanical brake (EMB). The braking control device 5 controls a braking force generation device (for example, the hydraulic pressure generation unit 3 or the EMB). In addition, in an autonomous vehicle, the braking control device 5 can execute various types of control based on a braking request from another device, for example, a braking request from an ECU related to autonomous driving or another function of the braking control device 5.

In addition, in the vehicle stop maintenance control, the control unit 52 may instantaneously (in a pulsed manner) decrease the actual braking force to the vehicle stop maintenance braking force. In addition, the increasing speed of the vehicle stop maintenance braking force (see the period from the time T3 to the time T4 in FIG. 4) may be equal to or smaller than the increasing speed of the required braking force, or may be equal to or larger than the increasing speed of the required braking force.

The invention claimed is:

1. A braking control device comprising:
a determination unit configured to determine whether a vehicle is in a stopped state;
a setting unit configured to set a vehicle stop maintenance braking force necessary for maintaining the stopped state of the vehicle; and
a control unit configured to execute, when the determination unit determines that the vehicle is in the stopped state and an actual braking force applied in the stopped state of the vehicle is greater than the vehicle stop maintenance braking force set by the setting unit, and while a required braking force required by at least one of a driver of the vehicle and another device is increasing, vehicle stop maintenance control for decreasing the actual braking force toward the vehicle stop maintenance braking force regardless of a required braking force required by at least one of a driver of the vehicle and another device.

2. The braking control device according to claim 1, wherein in the vehicle stop maintenance control, the control unit gradually decreases the actual braking force to the vehicle stop maintenance braking force.

3. The braking control device according to claim 2, wherein in the vehicle stop maintenance control, the setting unit increases the vehicle stop maintenance braking force toward the required braking force when a difference between the required braking force and the vehicle stop maintenance braking force is equal to or larger than a predetermined value.

4. The braking control device according to claim 3, wherein in the vehicle stop maintenance control, when increasing the vehicle stop maintenance braking force with an increase of the required braking force, the setting unit increases the vehicle stop maintenance braking force at an increasing speed smaller than an increasing speed of the required braking force.

5. The braking control device according to claim 4, wherein the control unit ends the vehicle stop maintenance control when a probability of starting up the vehicle is high.

6. The braking control device according to claim 3, wherein the control unit ends the vehicle stop maintenance control when a probability of starting up the vehicle is high.

7. The braking control device according to claim 2, wherein the control unit ends the vehicle stop maintenance control when a probability of starting up the vehicle is high.

8. The braking control device according to claim 1, wherein in the vehicle stop maintenance control, the setting unit increases the vehicle stop maintenance braking force toward the required braking force when a difference between the required braking force and the vehicle stop maintenance braking force is equal to or larger than a predetermined value.

9. The braking control device according to claim 8, wherein the control unit ends the vehicle stop maintenance control when a probability of starting up the vehicle is high.

10. The braking control device according to claim 8, wherein in the vehicle stop maintenance control, when increasing the vehicle stop maintenance braking force with an increase of the required braking force, the setting unit increases the vehicle stop maintenance braking force at an increasing speed smaller than an increasing speed of the required braking force.

11. The braking control device according to claim 10, wherein the control unit ends the vehicle stop maintenance control when a probability of starting up the vehicle is high.

12. The braking control device according to claim 1, wherein the control unit ends the vehicle stop maintenance control when a probability of starting up the vehicle is high.

\* \* \* \* \*